US011806899B2

(12) United States Patent
Aoki et al.

(10) Patent No.: US 11,806,899 B2
(45) Date of Patent: Nov. 7, 2023

(54) METHOD FOR PRODUCING PREPREG AND METHOD FOR PRODUCING FIBER-REINFORCED COMPOSITE MATERIAL

(71) Applicant: Toray Industries, Inc., Tokyo (JP)

(72) Inventors: Junichi Aoki, Ehime (JP); Takashi Ochi, Ehime (JP); So Nishino, Otsu (JP); Satoshi Enzaki, Otsu (JP); Takaaki Yamashita, Ehime (JP)

(73) Assignee: Toray Industries, Inc., Tokyo (JP)

( * ) Notice: Subject to any disclaimer, the term of this patent is extended or adjusted under 35 U.S.C. 154(b) by 306 days.

(21) Appl. No.: 16/494,824

(22) PCT Filed: Feb. 22, 2018

(86) PCT No.: PCT/JP2018/006483
§ 371 (c)(1),
(2) Date: Sep. 17, 2019

(87) PCT Pub. No.: WO2018/173618
PCT Pub. Date: Sep. 27, 2018

(65) Prior Publication Data
US 2020/0276733 A1   Sep. 3, 2020

(30) Foreign Application Priority Data
Mar. 22, 2017 (JP) ................................ 2017-055613

(51) Int. Cl.
*B29B 11/16* (2006.01)
(52) U.S. Cl.
CPC .................... *B29B 11/16* (2013.01)

(58) Field of Classification Search
CPC ........................... B29C 48/0018; B29B 11/16
(Continued)

(56) References Cited

U.S. PATENT DOCUMENTS

2005/0150593 A1   7/2005   Honma et al.
2009/0179358 A1*  7/2009   Otoshi .................... B29C 48/08
                                                    264/449
(Continued)

FOREIGN PATENT DOCUMENTS

EP   2377675 A1 * 10/2011 ........... B29B 15/122
JP   07109670 A    4/1995
(Continued)

OTHER PUBLICATIONS

English Translation of Nakatani (JP2004290771) (Year: 2004).*
(Continued)

*Primary Examiner* — Matthew J Daniels
*Assistant Examiner* — Hana C Page
(74) *Attorney, Agent, or Firm* — RatnerPrestia

(57) ABSTRACT

The present invention provides a technology in production of a prepreg and enhances the production efficiency, in which the technology allows the arrangement property and rectilinearity of reinforcing fibers to be well maintained and allows any resin to be applied stably at a high speed. A prepreg is produced by a method which includes: discharging a molten resin in planar form to form a resin film, and applying the resin film onto a reinforcing fiber sheet conveyed continuously, wherein the reinforcing fiber sheet is conveyed substantially in the horizontal direction, and wherein an angle made between the discharge direction of the resin and the conveyance direction of the reinforcing fiber sheet 1a is 80° or less.

7 Claims, 9 Drawing Sheets

(58) Field of Classification Search
USPC .......................................................... 156/181
See application file for complete search history.

(56) References Cited

U.S. PATENT DOCUMENTS

| | | |
|---|---|---|
| 2012/0064236 A1 | 3/2012 | Matsuzaki et al. |
| 2012/0100362 A1 | 4/2012 | Ellis et al. |
| 2016/0303777 A1 | 10/2016 | Miyauchi et al. |

FOREIGN PATENT DOCUMENTS

| | | |
|---|---|---|
| JP | 09225938 A | 9/1997 |
| JP | 2004290771 A | 10/2004 |
| JP | 2011132389 A | 7/2011 |
| JP | 2011162619 A | 8/2011 |
| JP | 2011251524 A | 12/2011 |
| JP | 2013022868 A | 2/2013 |
| JP | 2013184356 A | 9/2013 |
| JP | 2014000496 A | 1/2014 |
| JP | 2014069391 A | 4/2014 |
| JP | 2016203397 A | 12/2016 |
| JP | 2017154330 A | 9/2017 |
| WO | 03091015 A1 | 11/2003 |
| WO | 2010137558 A1 | 12/2010 |
| WO | 2010150022 A1 | 12/2010 |
| WO | 2015060299 A1 | 4/2015 |
| WO | 2015076981 A1 | 5/2015 |
| WO | 2017068159 A1 | 4/2017 |

OTHER PUBLICATIONS

English Translation of Koyama (JP2007320038) (Year: 2007).*
Koyama, English Translation of JP2007320038 (Year: 2007).*
International Search Report and Written Opinion for International Application No. PCT/JP2018/006483 dated Apr. 24, 2018. 6 pages.

* cited by examiner

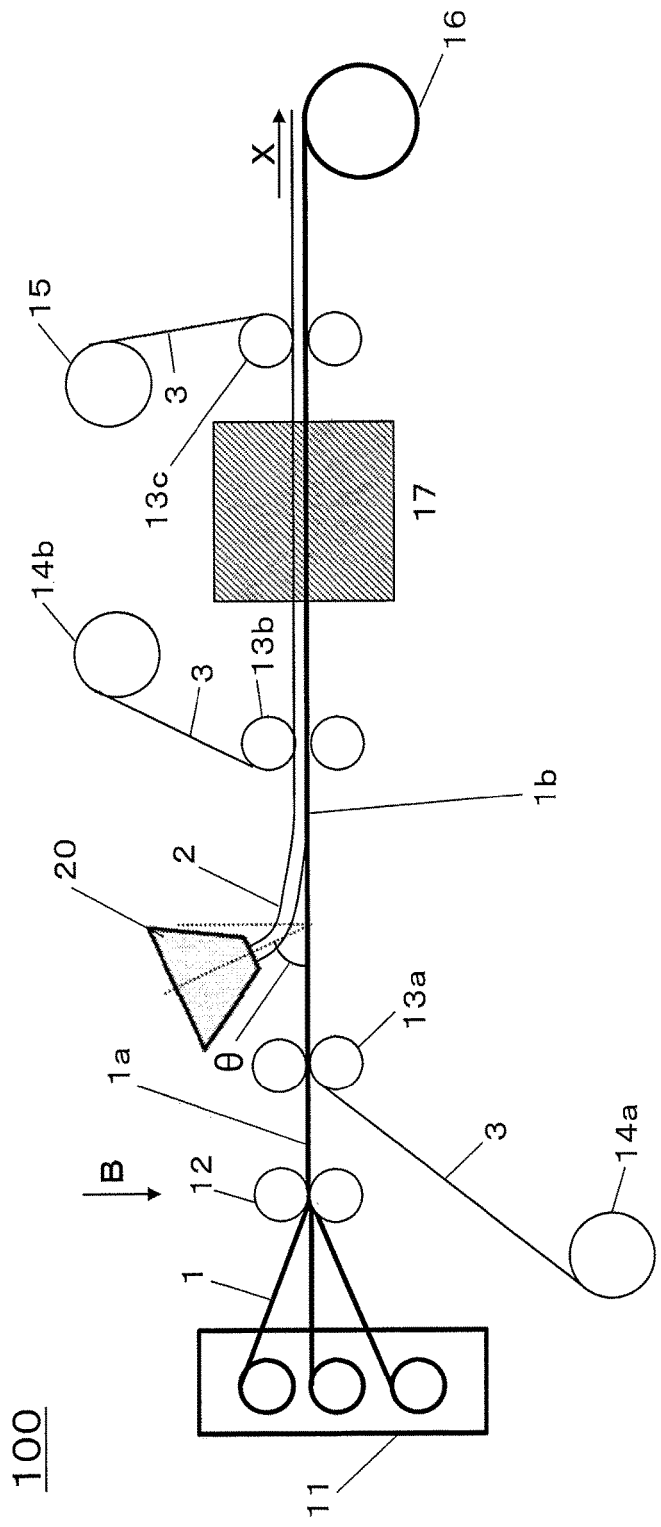
[Fig. 1]
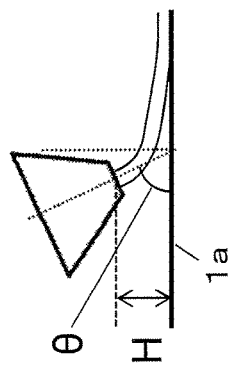
[Fig. 2]

[Fig. 3]
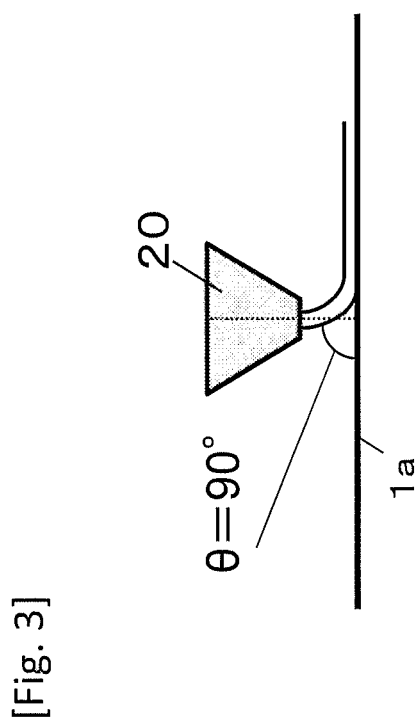

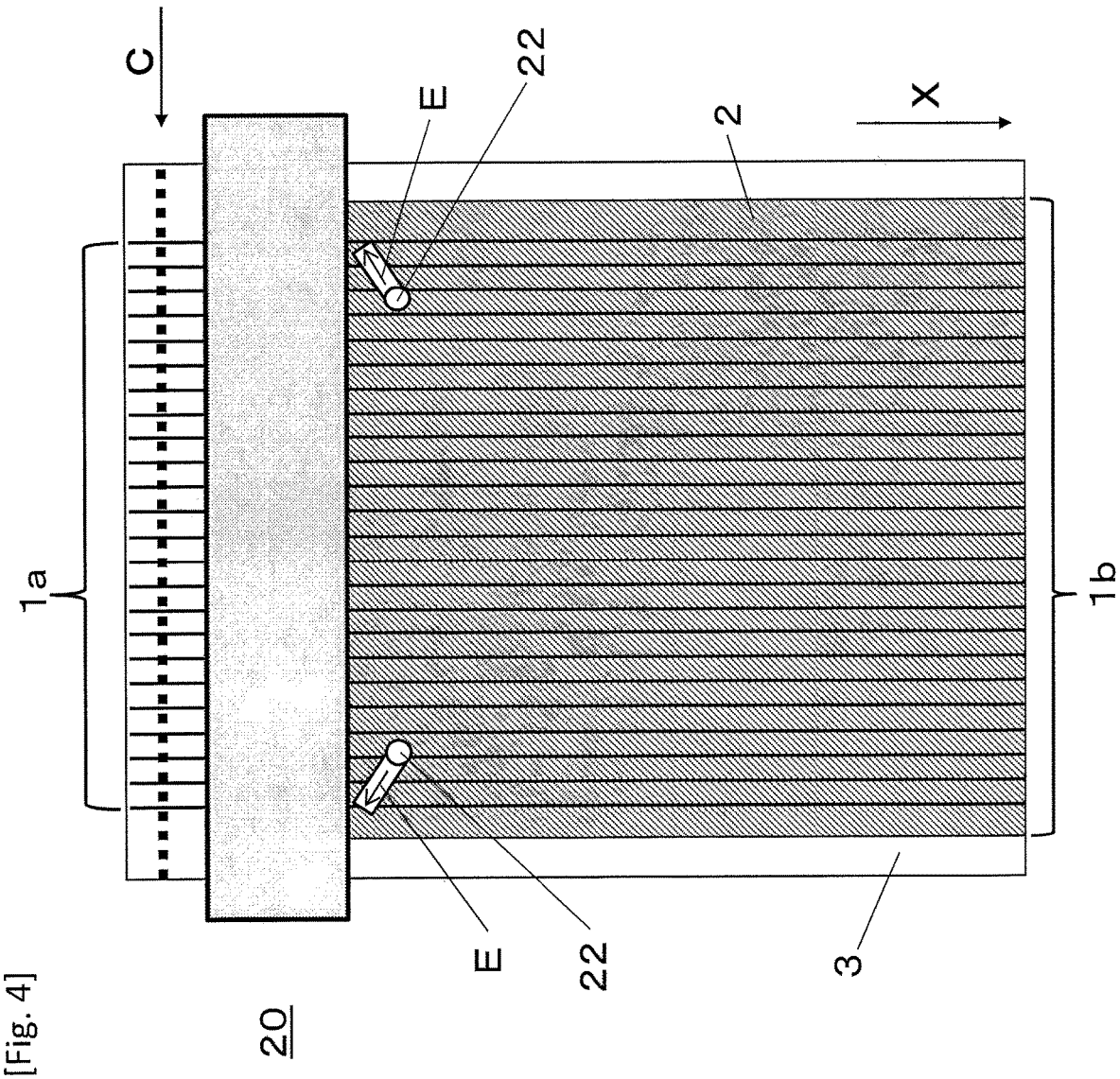

[Fig. 5]
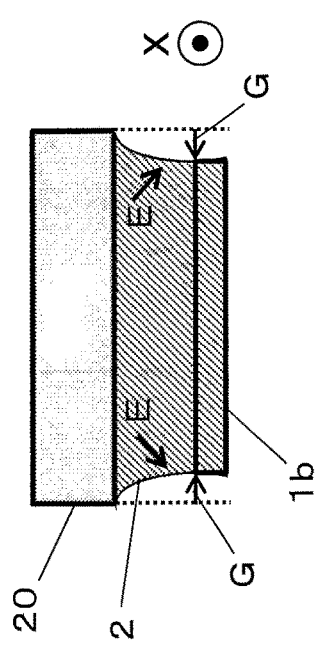
[Fig. 6]
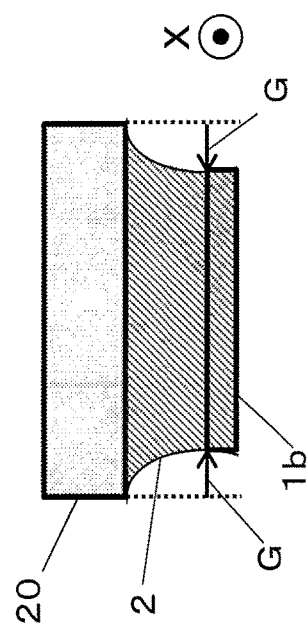

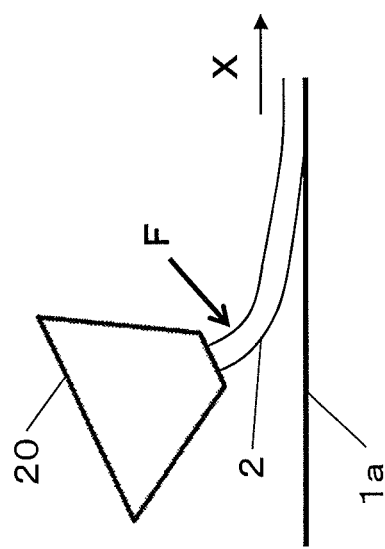
[Fig. 7]
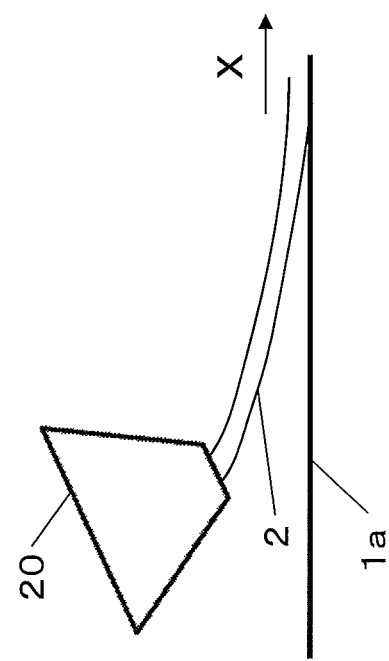
[Fig. 8]

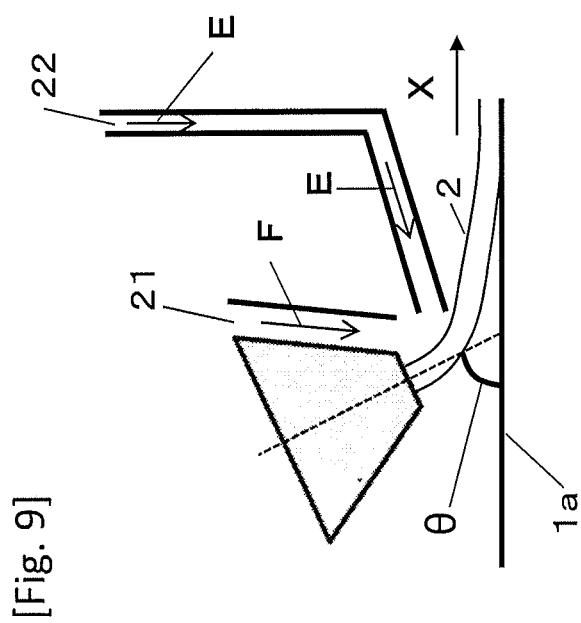

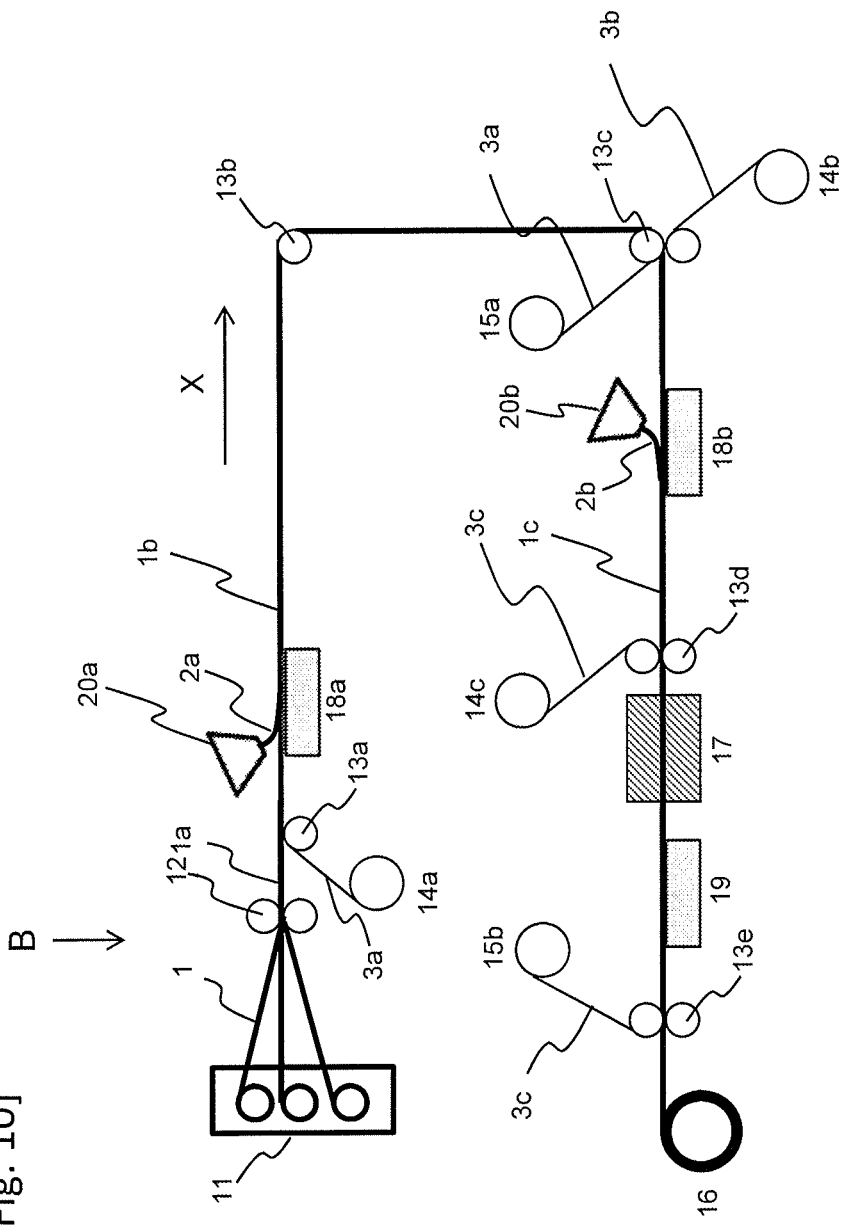
[Fig. 10]

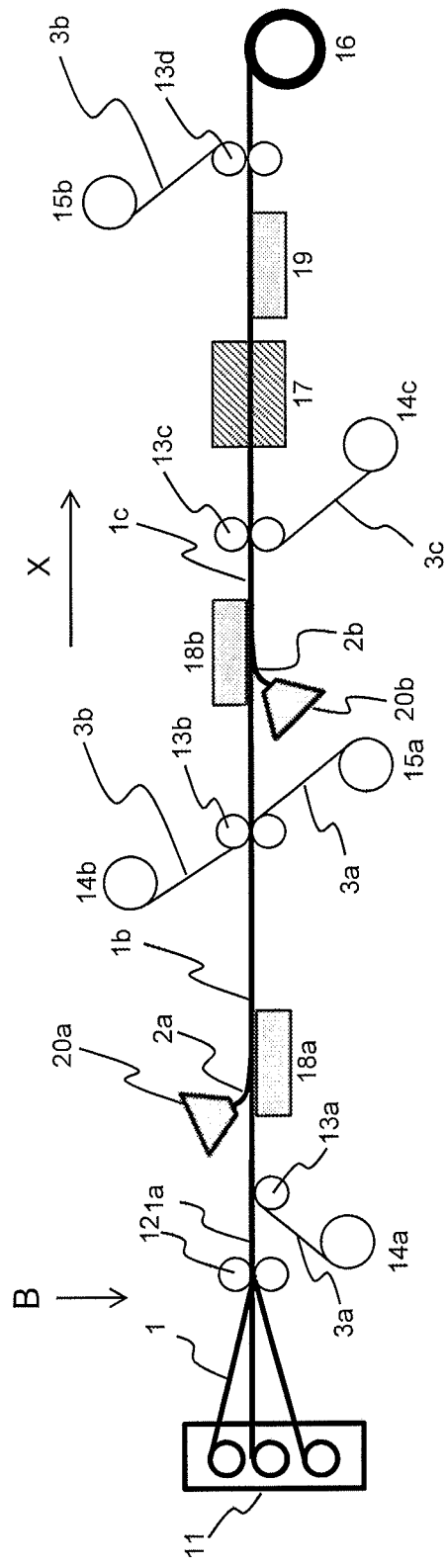

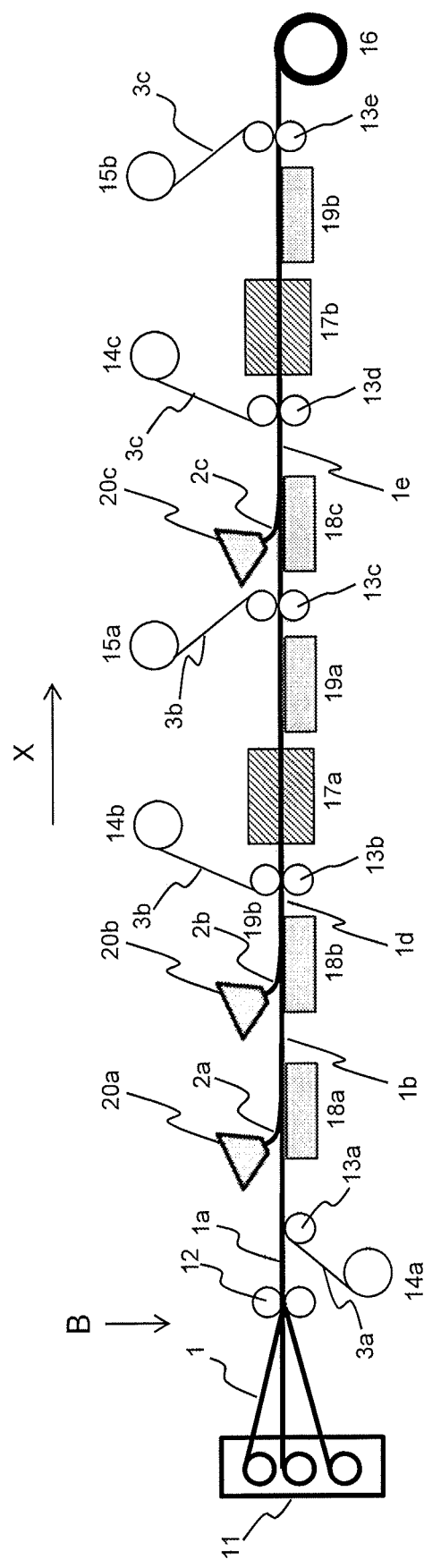

METHOD FOR PRODUCING PREPREG AND METHOD FOR PRODUCING FIBER-REINFORCED COMPOSITE MATERIAL

CROSS REFERENCE TO RELATED APPLICATIONS

This is the U.S. National Phase application of PCT/JP2018/006483, filed Feb. 22, 2018, which claims priority to Japanese Patent Application No. 2017-055613, filed Mar. 22, 2017, the disclosures of each of these applications being incorporated herein by reference in their entirety for all purposes.

FIELD OF THE INVENTION

The present invention relates to an efficient method of producing a prepreg which is a precursor of a fiber reinforced composite material.

BACKGROUND OF THE INVENTION

Fiber reinforced composite materials (FRP) in which a matrix resin containing a thermoplastic resin or a thermosetting resin is reinforced with a reinforcing fiber are used in various fields such as aerospace materials, automobile materials, industrial materials, pressure vessels, construction materials, housings, medical applications, and sports applications. Carbon fiber reinforced materials (CFRP) are widely and suitably used particularly in cases where a high mechanical property and lightness are required. In some of the cases where cost has priority over a mechanical property and lightness, glass fiber reinforced composite materials (GFRP) are used. FRP is obtained as an intermediate base material by impregnating a reinforcing fiber with a matrix resin, the intermediate base material is laminated and molded and in addition, thermally cured if a thermosetting resin is used, and then, members composed of FRP are produced. In the above-mentioned applications, planar objects or objects formed by folding planar objects are often used, and two-dimensional sheet-like objects are more widely used as intermediate base materials of FRP than one-dimensional strands or roving-like objects, from the viewpoint of lamination efficiency and moldability achieved in producing such members.

In addition, an attempt to enhance production efficiency for members composed of FRP has recently promoted the mechanization and automation of lamination of sheet-like intermediate base materials, and here, narrow tape-like intermediate base materials are suitably used. Narrow tape-like intermediate base materials can be obtained by slicing broad sheet-like intermediate base materials into tapes having a desired width or impregnating a narrow reinforcing fiber bundle sheet directly with matrix resins.

As two-dimensional sheet-like intermediate base materials, prepregs obtained by impregnating, with matrix resins, reinforcing fiber sheets formed by arranging the reinforcing fibers into sheet form are widely used. Examples of reinforcing fiber sheets used for prepregs include UD sheets obtained in sheet-like form by arranging reinforcing fibers unidirectionally and woven fabrics obtained by arranging reinforcing fibers multidirectionally. UD sheets are often used particularly in cases where the mechanical property has priority. Differently from this, woven fabrics are used in some of the cases where formativeness has priority.

A hot-melt process that is one of the methods of producing prepregs is a method in which a matrix resin is melted and then applied onto release paper sheets (a resin film forming process), a laminated structure is produced in which a reinforcing fiber sheet is sandwiched between the matrix resin sheets at the upper side and lower side of the sheet, and then, the inside of the reinforcing fiber sheet is impregnated with the matrix resin by heat and pressure. There is a problem in that this method has many steps, cannot increase the production speed, and is costly.

In the industrial fields and the like where higher efficiency rather than a mechanical property is required for FRP, a process in which a reinforcing fiber sheet is directly coated with a resin has been on trial for the purpose of omitting a resin film forming process. In this case, the matrix resin is often a thermoplastic resin in particular. For example, Patent Literature 1 states that a reinforcing fiber sheet is coated directly with a thermoplastic resin using what is called a T-die. In addition, Comparative Example 1 in Patent Literature 2 states that PPS (polyphenylenesulfide) which is a thermoplastic resin is laminated on a UD sheet, using a film slit die (for a width of 100 mm).

As Example 1 in Patent Literature 3 states that the production speed of prepreg is 5 m/minute, there is a problem in that a conventional production speed of prepreg is slow.

PATENT LITERATURE

Patent Literature 1: JP 2013-184356 A
Patent Literature 2: WO 2003/091015
Patent Literature 3: JP 2014-069391 A

SUMMARY OF THE INVENTION

Taking into consideration the quality of FRP, it is important that fuzzing and cleavage caused to reinforcing fibers by abrasion are suppressed in a matrix resin coating step. In order to stabilize the mechanical property and grade of FRP, it is also important that the uniformity of the basis weight of a matrix resin to be applied (the mass of a matrix resin per $m^2$) is good. Furthermore, the arrangement property and rectilinearity of the reinforcing fibers in a prepreg are important particularly in cases where a UD sheet is used.

Further, it is important for higher efficiency that the conveyance speed (line speed) of a reinforcing fiber sheet is made as high as possible, wherein the conveyance speed leads to a production speed of a prepreg.

Patent Literature 1 discloses a method in which a thermoplastic resin is discharged from a T-die and pressed against a reinforcing fiber sheet, but the method poses a problem in that the reinforcing fibers are more likely to cause cleavage and fuzzing and disturb the arrangement property and rectilinearity. In addition, the method causes a pool of the discharged resin to be formed on the reinforcing fiber sheet, as described in FIG. 3 in Patent Literature 1, and accordingly, poses a problem in that the basis weight uniformity is more likely to be worsened.

The method disclosed in Comparative Example 1 in Patent Literature 2 poses a problem in that the method applied to a thermosetting resin is more likely to generate resin film breakage, making uniform coating difficult.

That is, a problem addressed by the present invention is to provide a technology that allows the arrangement property and rectilinearity of reinforcing fibers to be well maintained and allows any resin to be applied stably at a high speed in production of prepreg, whereby the production efficiency is enhanced.

The problem can be solved by the following production method. That is, a method of producing a prepreg according to the present invention includes: discharging a molten resin in planar form to form a resin film, and applying the resin film onto a reinforcing fiber sheet conveyed continuously, wherein the reinforcing fiber sheet is conveyed substantially in the horizontal direction, and wherein an angle made between the discharge direction of the resin and the conveyance direction of the reinforcing fiber sheet is 80° or less.

In addition, a method of producing a fiber reinforced composite material according to the present invention is characterized in that a prepreg obtained by the above-mentioned method of producing a prepreg is then cured.

According to the present invention, the technology that allows the arrangement property and rectilinearity of reinforcing fibers to be well maintained in production of a prepreg and allows any resin to be applied stably at a high speed can enhance the production efficiency.

BRIEF DESCRIPTION OF DRAWINGS

FIG. 1 is a schematic diagram depicting an overview of an example of a production process of a prepreg according to the present invention.

FIG. 2 is an enlarged side view of the coating section portion in FIG. 1.

FIG. 3 is a side view of a coating section in a conventional coating method.

FIG. 4 is a top view of the coating section and its vicinity, as viewed from above.

FIG. 5 is a front view for explaining the state of the edge portions of a resin film (with the air flow control means).

FIG. 6 is a front view for explaining the state of the edge portions of a resin film (without the air flow control means).

FIG. 7 is a side view for explaining the state of the planar portion of a resin film (with the air flow control means).

FIG. 8 is a side view for explaining the state of the planar portion of a resin film (without the air flow control means).

FIG. 9 is a side view depicting an example of the coating section portion including a control means carried out using an air flow.

FIG. 10 is a schematic diagram depicting an overview of an example of a production process of a prepreg according to the present invention.

FIG. 11 is a schematic diagram depicting an overview of another example of a production process of a prepreg according to the present invention.

FIG. 12 is a schematic diagram depicting an overview of another example of a production process of a prepreg according to the present invention.

DETAILED DESCRIPTION OF EMBODIMENTS OF THE INVENTION

Preferred embodiments of the present invention will be described with reference to the drawings. In this regard, the following description illustrates one of the embodiments of the present invention, and is not to be limited to the embodiment, and various modifications can be made to the invention to the extent that they do not depart from the object and effect of the present invention.

First, the outline of the method of producing a prepreg according to the present invention will be described with reference to FIG. 1. FIG. 1 is a schematic diagram depicting a method and device for providing a reinforcing fiber sheet with a resin composition according to one embodiment of the present invention.

A prepreg production device 100 includes: a plurality of creels 11 for unwinding reinforcing fibers 1; an arrangement device 12 for obtaining a reinforcing fiber sheet 1a (the fibers are arranged in the depth direction of the page in FIG. 1) which is a unidirectional arrangement of the unwound reinforcing fibers 1; conveyance rolls 13 (13a, 13b, and 13c) which are a running mechanism for running the reinforcing fiber sheet 1a in the substantially horizontal direction X; a coating section 20 from which a resin 2 is discharged in planar form; and a wind-up device 16 for a reinforced fiber sheet 1b provided with the resin 2. In addition, the coating device 100 can be equipped with release sheet supply devices 14 (14a and 14b) for supplying a release sheet 3 and with a release sheet wind-up device 15, if necessary. Here, allowing the running direction to be substantially horizontal has an advantage that makes it possible to make good use of an existing prepreg conveyance device. Being substantially horizontal refers to a state in which the reinforcing fiber sheet 1a and the prepreg provided with the resin 2 are conveyed without being conveyed at a slant to the horizontal plane and having any concave-convex surface in the region from 30 cm before to 30 cm after the starting point at which the resin 2 lands on the reinforcing fiber sheet 1a. Specifically, the deviation from the horizontal plane in the conveyance direction is preferably 15° or less, with a view to making good use of an existing prepreg conveyance device.

Here, examples of the reinforcing fiber 1 include carbon fibers, graphite fibers, glass fibers, metal fibers, metal oxide fibers (alumina fibers and the like), metal nitride fibers, silicon carbide fibers, boron fibers, tungsten carbide fibers, organic fibers (aramide fibers, polybenzoxazole fibers, polyvinyl alcohol fibers, polyethylene fibers, and the like), ceramics fibers, and the like. Only one kind of reinforcing fiber may be used for the same prepreg, or different kinds of reinforcing fibers may be used as a regular or irregular arrangement. It is preferable to use carbon fiber, from the viewpoint of the mechanical property and lightness of FRP.

In addition, the reinforcing fibers in the reinforcing fiber sheet do not necessarily have to be integrated, for example by intertangling, and FIG. 1 illustrates a UD sheet, which is a plurality of reinforcing fibers arranged unidirectionally in planar form, but woven fabrics, non-woven fabrics, paper, and the like can also be selected suitably in accordance with the application of FRP. Here, the reinforcing fiber sheet is not limited to any one having a particular thickness or width, and the thickness and the width can suitably be selected in accordance with the purpose or application. In this regard, the reinforcing fiber sheet is easy to handle and accordingly preferable when the aspect ratio defined using the width and thickness is 10 or more. FIG. 4 is a top view of the coating section and its vicinity, as viewed in the direction B (from above) in FIG. 1. The reinforcing fiber sheet 1a (a UD sheet in this case) is depicted as if the reinforcing fibers 1 are arranged with a clearance between the fibers, but, in reality, it is preferable to arrange the reinforcing fibers 1 with no clearance between the fibers, from the viewpoint of the quality of the prepreg and the mechanical property of FRP. In addition, it is preferable to convey the reinforcing fiber sheet with suitable tension applied thereto, with a view to retaining the arrangement of the reinforcing fibers.

In this regard, even in cases where the single fibers of reinforcing fiber are arranged into one yarn in tape-like form, the yarn corresponds to one form of the reinforcing fiber sheet.

A resin coating step can be carried out, for example, by the following procedures. First, a resin is melted, and the molten resin is metered and transferred. For a prepreg, the resin is often solid at room temperature, and accordingly, is liquefied by heating. In addition, in a case where the resin is a viscous liquid at normal temperature, the resin can be heated so as to become less viscous enough to be discharged from a discharge portion and thus, can be used, and such a case is included as a case of melting in the present invention. For example, a gear-pump can be used to meter the amount of resin and at the same time, to transfer the molten resin to a coating head. Then, the resin is divided into a plurality of flows in the coating head and introduced into the discharge portion so that the distributivity of the resin in the coating head can be enhanced. Then, the resin is introduced into the discharge portion and discharged from the discharge portion.

Examples of resins used in the present invention include thermosetting resins, thermoplastic resins, mixtures of a thermosetting resin and a thermoplastic resin, and the like.

Examples of thermosetting resins include epoxy resins, maleimide resins, polyimide resins, resins having an acetylene terminal, resins having a vinyl terminal, resins having an allyl terminal, resins having a nadic acid terminal, and resins having a cyanate ester terminal. These can be used generally in combination with a hardener or a curing catalyst. In addition, these thermosetting resins can suitably be used in mixture.

As thermosetting resins suitable for the present invention, epoxy resins are suitably used in that epoxy resins have excellent heat resistance, chemical resistance, and mechanical property. In particular, amines, phenols, and epoxy resins whose precursor is a compound having a carbon-carbon double bond are preferable. Specific examples include, but are not limited to: epoxy resins whose precursors are amines, such as various isomers of tetraglycidyl diaminodiphenylmethane, triglycidyl-p-aminophenol, triglycidyl-m-aminophenol, and triglycidylaminocresol; epoxy resins whose precursors are phenols, such as bisphenol A epoxy resins, bisphenol F epoxy resins, bisphenol S epoxy resins, phenol novolac epoxy resins, and cresol novolac epoxy resins; epoxy resins whose precursors are compounds having a carbon-carbon double bond, such as alicyclic epoxy resins; and the like. Bromated epoxy resins resulting from bromating these epoxy resins are also used. Epoxy resins whose precursors are aromatic amines typified by tetraglycidyl diaminodiphenylmethane are most suitable for the present invention because the epoxy resins have favorable heat resistance and favorable adhesiveness to reinforcing fibers.

Thermosetting resins are preferably used in combination with hardeners. For example, for epoxy resins, a hardener can be used if the hardener is a compound having an active group capable of reacting with an epoxy group. Preferably, compounds having an amino group, an acid anhydride group, or an azido group are suitable. Specifically, various isomers of dicyandiamide and diaminodiphenyl sulfone are, and amino benzic acid ester types are, suitable. According to specific description, dicyandiamide provides excellent storage stability of prepreg, and accordingly, is used by preference. In addition, various isomers of diaminodiphenyl sulfone afford cured objects having favorable heat resistance, and accordingly, are most suitable for the present invention. As amino benzic acid ester types, trimethyleneglycol di-p-aminobenzoate and neopentylglycol di-p-aminobenzoate are used by preference and have lower heat resistance but have excellent tensile strength, compared with diaminodiphenyl sulfone, and accordingly, are used selectively in accordance with the application. Needless to say, a curing catalyst can also be used, if necessary. In addition, a hardener or a curing catalyst and a complexing agent capable of forming a complex can be used together, with a view to enhancing the pot life of a thermosetting resin. A hardener, curing catalyst, and complexing agent such as these can be contained in the resin.

Thermoplastic resins suitable for the present invention are thermoplastic resins having, in the principal chain, a bond selected from a carbon-carbon bond, amide bond, imide bond, ester bond, ether bond, carbonate bond, urethane bond, urea bond, thioether bond, sulfone bond, imidazole bond, and carbonyl bond, and are more preferably a group of thermoplastic resins belonging to engineering plastics such as polyacrylate, polyamide, aramide, polyester, polycarbonate, polyphenylenesulfide (PPS), polybenzimidazole (PBI), polyimide (PI), polyetherimide (PEI), polysulfone (PSU), polyethersulfone (PES), polyetheretherketone (PEEK), polyetherketoneketone (PEKK), polyaryletherketone (PAEK), and polyamideimide (PAI). In particular, PPS, PES, PI, PEI, PSU, PEEK, PEKK, PEAK, and PAI have excellent heat resistance, and accordingly, are most suitable for the present invention. The molecular weights of these thermoplastic resins are not limited to particular ones, and the thermoplastic resins can suitably be selected from the range from what is called oligomers to ultrahigh molecular weight substances. As oligomers, oligomers having, at the terminal or in the molecular chain, a functional group capable of reacting with a thermosetting resin can be used.

In the present invention, a mixture of the above-mentioned thermosetting resin and a thermoplastic resin is also suitably used. A mixture of a thermosetting resin and a thermoplastic resin affords better results than a thermosetting resin used singly. This is because a thermosetting resin and a thermoplastic resin have different characteristics: in other words, a thermosetting resin is generally disadvantageously brittle but can be molded at low pressure in an autoclave, and contrarily, a thermoplastic resin is generally advantageously tough but difficult to mold at low pressure in an autoclave, and accordingly, using these in mixture can effect a balance between properties and moldability. Such a mixture to be used preferably contains a thermosetting resin at more than 50 mass % of the total resin amount, from the viewpoint of the mechanical property of FRP obtained by curing prepreg.

In addition, the resin in the present invention can preferably contain any kind of additive for the purpose of enhancing the characteristics of FRP, process stability, and the like. Examples of such additives include organic particles, inorganic particles, fillers, performance improvers, and the like, and more specific examples include: organic polymer particles for enhancing the toughness and damping performance of the resulting FRP; carbon particles, carbon nanotubes and the like for enhancing the conductivity. In addition, examples include organic substances and polymers for controlling the surface tackiness properties of the prepreg.

In this regard, the organic polymer particles are preferably insoluble in a matrix resin, and as such organic polymer particles, ones described in, for example, WO 2009/142231 can be used. More specifically, polyamides and polyimides can preferably be used. Among them, polyamides are most preferable in that they have excellent toughness and accordingly, can improve the impact resistance significantly. Examples of polyamides that can be suitably used include nylon 12, nylon 11, nylon 6, nylon 66, nylon 6/12 copolymers, a nylon modified to have a semi-IPN (macromolecular interpenetrating network structure) with an epoxy compound described in Example 1 of JP 01-104624 A (semi-IPN nylon), and the like. As to the shape of this thermoplastic resin particle, the particle may be a spherical particle, a nonspherical particle, or a porous particle, and the spherical shape is particularly preferable in the production method according to the present invention in order not to decrease the resin flow property. In addition, the spherical shape is a preferable aspect in that the spherical shape has no starting point for stress concentration and affords high impact resistance.

Examples of commercially available polyamide particles that can be used include SP-500, SP-10, TR-1, TR-2, 842P-48, 842P-80 (which are all manufactured by Toray Industries, Inc.), "Orgasol (registered trademark)" 1002D, 2001UD, 2001EXD, 2002D, 3202D, 3501D, 3502D (which are all manufactured by Arkema K.K.), "Grilamid (registered trademark)" TR90 (manufactured by Emser Werke, Inc.), "TROGAMID (registered trademark)" CX7323, CX9701, CX9704 (manufactured by Degussa AG), and the like. These polyamide particles may be used singly or two or more kinds thereof may be used in combination.

The present invention allows a reinforcing fiber sheet to be coated directly with a resin and thus, can omit a film forming process, compared with a technique in which a resin preliminarily formed into a film is applied, and the present invention can make a production process more efficient, compared a hot-melt process that is a conventional method of producing a prepreg. Here, the coating method for resin is important, and in the present invention, it is important that molten resin is discharged in planar form, and then, the formed resin film is applied onto a reinforcing fiber sheet conveyed continuously. Here, discharging resin in planar form to form a resin film means forming a film-like object in a space into which the resin is discharged, and the resin film may be in a molten state, semi-solid state, or solid state. Because of this, the present invention involves noncontact coating, and accordingly, can solve various problems due to the abrasion of the coating head and/or the discharged resin against the reinforcing fiber sheet, compared with a technique in which a coating head is pressed onto the reinforcing fiber sheet, as described in Patent Literature 1.

Next, it is important in the present invention that the reinforcing fiber sheet is conveyed substantially in the horizontal direction, and that an angle made between the discharge direction of the resin and the conveyance direction of the reinforcing fiber sheet (this angle may be referred to as a "coating angle" for convenience) is 80° or less. FIG. 3 shows a conventional general coating method, and the angle made between the discharge direction of the resin and the conveyance direction of the reinforcing fiber sheet is 90°. The present inventors carried out an experiment using a thermosetting resin (an epoxy resin and the like), but were not able to effect stable coating with an angle of 90° made between the discharge direction of the resin and the conveyance direction of the reinforcing fiber sheet. In this regard, in cases where a coating head is pressed as described in Patent Literature 1, it is conceivable that no such problem occurs because there is no formation of a resin film in the air. However, the present inventors have discovered that allowing the angle, as shown in FIG. 1, between the discharge direction of the resin and the conveyance direction of the reinforcing fiber sheet to be 80° or less enables coating to be carried out stably at a high speed even when the resin is discharged in planar form to form a resin film. The smaller the coating angle θ is, the more stably it enables coating to be carried out at a high speed, and accordingly, the more preferable. However, a smaller coating angle θ is more likely to cause the size of the coating head to interfere with the conveyance step of the reinforcing fiber sheet, and accordingly, causes restrictions on the device in some cases. From this viewpoint, the coating angle θ is preferably 30 to 70°.

Allowing the coating height H, as shown in FIG. 2, which is a distance between the center of the discharge line and the reinforcing fiber sheet 1a to be 3 mm or more makes it possible to suppress the contamination in the coating section caused by pooling of the resin in the coating section and to enhance the coating stability, and accordingly, is preferable. In addition, allowing the coating height H to be 18 mm or less stabilizes the formation of a resin film in a space into which the resin is discharged, and accordingly, is preferable.

The coating section 20 has only to be a device from which resin can be discharged in planar form. According to description in more detail, a suitable example is a device from which resin having a uniform thickness in the width direction can be discharged through a resin discharging nozzle to form a film in planar form or curtain form. The device is generally a curtain coating device or a planar form coating device called a die coater, in which a structure allowing resin to be discharged through a slit having a uniform thickness and no intermittence can be used. In addition, the coating section 20 preferably has a heating mechanism that can heat the resin 2 immediately before the discharge to adjust the viscosity to any value. In particular, in cases where a thermosetting resin is used, risks of deterioration, viscosity increase, and runaway reaction are caused according to the heat history of the resin during storage, and accordingly, it is preferable to shorten the heating time for the resin and carry out suitable temperature control.

In addition, the present invention results in allowing the resin film to have a free surface in a space into which the resin is discharged, and accordingly, the film shape of the resin film is more likely to be deformed. In some cases, for example, the formation of a resin film is made unstable, or the uniformity of the basis weight of the resin film is impaired, for example, because the edge portion of the resin film causes shrinkage and retraction in the width direction owing to what is called "neck-in", or because the whole resin film is pulled when the reinforcing fiber sheet is conveyed at a high speed. Because of this, it is preferable to apply an air flow to the edge portion of the resin film in the width direction and stabilize film formation.

The resin film undergoes a phenomenon called "neck-in" in which the edge portion of the resin film is pulled toward the center of the resin film in the direction perpendicular to the tensile direction, whereby the width of the resin film is decreased (see FIGS. 5 and 6. The portion indicated by G is a decrease in the width). This phenomenon is considered to be more likely to occur particularly when high tension is applied to a resin film, for example, because the resin has high viscosity, or because the tensile speed is high. It is preferable to suppress neck-in particularly in cases where the resin film is formed at a high speed by the method of producing a prepreg according to the present invention. Because of this, it is preferable in the present invention to apply, for example, blow (FIG. 4), an air flow toward the edge portion from the front of the resin film to thereby apply an air flow so that the edge portion of the resin film can be expanded. The air flow for this purpose is referred to as air to edge portion in the present invention. A means that can be used to apply air to edge portion is generally a metal tube or a nozzle. It is preferable that the air flow speed, flow rate, angle, position, and temperature of the air to edge portion is suitably selected, taking into consideration, for example, neck-in and whether the resin film is formed stably. In addition, air to edge portion can be used at the time when a resin film is applied. The time when a resin film is applied is suitably selected from, for example, the time before a resin is discharged from a nozzle, the time when the discharge of the resin from the nozzle is started, the time during which the resin is discharged from the nozzle, and the time during which the formed resin film is applied to a reinforcing fiber sheet. The selected time can thus be adopted.

In addition, as shown in FIG. 8, there are some cases in which the resin film is excessively pulled in the tensile direction of the resin film, in other words, in the prepreg conveyance direction, and in these cases, an air flow is preferably blown from the front of the resin film to the whole face or almost the whole face of the resin film, for example, as in FIG. 7, in such a manner that the position at the resin film comes in contact with the reinforcing fiber sheet is brought nearer to the coating section side. The air flow for this purpose is referred to as air to planar portion in the present invention. It is preferable that the air flow speed, flow rate, angle, position, and temperature of the air to planar portion is suitably selected, taking into consideration, for example, whether the resin film is formed stably. A means that can be used to apply air to planar portion is generally a slit-shaped nozzle or a nozzle that is linearly arranged pores. In addition, it is preferable that the coating section includes both air application devices for applying air to edge portion and air to planar portion, from the viewpoint of the possibility of the device being made compact and, in addition, handleability. In addition, air can be applied to the planar portion of the resin film by sucking air on the back side of the resin film so that the position at which the resin film comes in contact with the reinforcing fiber sheet can be brought nearer to the coating section side.

A release sheet used in the present invention is not limited to a particular one as long as the release sheet has release characteristics sufficient for a coating resin, and has suitable elasticity and stiffness, and, for example, a film coated with a release paper sheet or a release agent can be used.

In the present invention, the conveyance speeds (line speeds) of the reinforcing fiber sheet and the prepreg are preferably higher, with a view to enhancing productivity. However, it is necessary to be careful because a higher conveyance speed can result in requiring investment in facilities for stable conveyance. From this viewpoint, the conveyance speed is preferably 10 m/minute to 100 m/minute.

In addition, it is possible in the present invention to incorporate an impregnating step, if necessary, after the resin coating step, as shown in FIG. 1. That is, an impregnation operation can be carried out after a resin is applied onto the reinforcing fiber sheet conveyed continuously. The impregnation allows the resin applied on the reinforcing fiber sheet to permeate through the inside of the reinforcing fiber sheet, and accordingly, results in providing a prepreg having good handleability, and in addition, generation of voids caused in unimpregnated portions can be effectively suppressed when the prepreg is processed into a composite material, in which a decrease in the mechanical property can be suppressed. A prepreg having many unimpregnated portions causes the reinforcing fibers to have insufficient convergence, resulting in having poor handleability in some cases, and accordingly, not only has a poor mechanical property but also is of poor quality in some cases.

An impregnation device is not limited to a particular one, and can suitably be selected from known ones in accordance with the purpose. For example, as described in JP 2011-132389 A and WO 2015/060299, impregnation can be promoted by preheating a laminate of a reinforced fiber sheet and a resin on a hot plate and sufficiently softening the resin on the reinforced fiber sheet, followed by using a device for pressing with nip rolls which are heated. The hot plate temperature and nip roll surface temperature for preheating, the linear pressure of the nip rolls, and the diameter and number of the nip rolls can suitably be selected so as to achieve a desired degree of impregnation. In addition, it is also possible to use such "S-wrap rolls" as described in WO 2010/150022, wherein a prepreg sheet runs in S-shape through the S-wrap rolls. FIG. 1 in WO 2010/150022 describes an example in which a prepreg sheet runs in S-shape, but the contact length between the sheet and the roll may be adjusted in U-shape, V-shape, or A-shape as long as impregnation can be carried out. In addition, opposing contact rolls can be added in cases where the impregnation pressure is increased to enhance the degree of impregnation. Furthermore, as described in FIG. 4 in WO 2015/076981, it is also possible to attempt to increase the production speed of prepreg by arranging a conveyor belt opposite to "S-wrap rolls" and thereby enhancing impregnation efficiency. In addition, as described in WO 2017/068159, JP 2016-203397 A, and the like, it is also possible to enhance impregnation efficiency by subjecting prepreg to ultrasonication to heat the prepreg rapidly before impregnation. In addition, as described in JP 2017-154330 A, it is also possible to use an impregnation device in which a plurality of "squeeze blades" are vibrated by an ultrasonic generator. In addition, as described in JP 2013-22868 A, it is also possible to fold a prepreg up and carry out impregnation.

In this regard, both a material in which a resin is only laminated on a reinforcing fiber sheet and a material in which a reinforcing fiber is impregnated sufficiently with a resin are referred to as a prepreg in the present invention.

FIG. 1 describes the coating section and the impregnation device, one each only, but needless to say, these, two or more each, can be installed in connection. For example, using two coating sections and two impregnation devices makes it possible that what is called a two-stage impregnation is carried out, wherein the second section and the second device allows a resin composition containing a large amount of resin particles to be used for coating and impregnation. In addition, applying a highly reactive component and a stable component separately using a plurality of coating heads enables even a highly reactive component to be applied in a low-reactive state (for example, at a low temperature). In addition, it is possible to separate a component having high melt viscosity and use it for coating (for example, at high temperature and/or over a large discharge area). Using a plurality of coating heads in this manner enables the coating conditions to have flexibility in the coating step, and accordingly, is preferable.

Using two or more coating heads also enables both faces of the reinforcing fiber sheet to be coated with a resin. It is obviously possible to coat one face with a resin and impregnate the one face with the resin, but coating both faces with a resin and impregnating both the faces with the resin enables the prepreg to be of high grade and suppresses generation of voids. In cases where both faces are coated with a resin, both the faces may be simultaneously coated using a plurality of coating heads disposed at the positions corresponding to each other on the front face side and the back face side, and both the faces may be sequentially coated with a resin by coating one face with the resin and then coating the other face with the resin.

FIG. 10 shows an example of a method of coating both faces, wherein a plurality of reinforcing fibers 1 withdrawn from creels 11 are formed into a reinforcing fiber sheet 1a by an arrangement device 12. Then, a release sheet 3a unreeled from a release sheet supply device 14a is inserted onto the lower face of the reinforcing fiber sheet 1a on a conveyance roll 13a. Then, a resin 2a is discharged from a first coating head 20a, and a prepreg 1b provided with a resin 2a is formed. Then, the prepreg passes by conveyance rolls 13b and 13c, and the upper face and the lower face are thus inverted. In addition, the release sheet 3a is peeled off at the conveyance rolls 13c, and instead, a release sheet 3b is inserted onto the face of the prepreg 1b provided with the resin 2a, wherein the face is opposite from the face provided with the resin 2a. Then, a resin 2b is discharged from a second coating head 20b, and a prepreg 1c is formed in which both faces of the reinforcing fiber sheet is provided with the resin. Furthermore, a release sheet 3c is layered onto the prepreg 1c at conveyance rolls 13d, and the resulting sheet is allowed to undergo impregnation using an impregnation device 17. Then, the resulting sheet passes through a cooling device 19, the release sheet 3c is peeled off at conveyance rolls 13e, and the resulting sheet can be wound up by a wind-up device 16. Here, FIG. 10 does not show means for applying air to edge portion and air to planar portion. In this regard, the resin 2a, the resin 2b, and the resin 2c may be of the same kind or of different kinds, and in addition, each resin may contain an additive or particles.

FIG. 11 shows an aspect of another example of a method of coating both faces. This example is different from the example in FIG. 10, and the reinforcing fiber sheet provided with a resin is conveyed in the horizontal direction without being turned back. Also here, means for applying air to edge portion and air to planar portion are not shown. The resin from the coating head 20b can be applied by a noncontact physical means such as a wind force, or an electrostatic means.

In addition, in cases where a plurality of coating heads are used, it is also possible to laminate different resins from different coating heads or to add a hardener or any kind of additive. This will be described in detail with reference to FIG. 12. In this regard, FIG. 12 illustrates a case of three coating heads, but two coating heads or four or more coating heads are also possible. In addition, the number of the impregnation devices is also two in the illustrated example, but it may be one or three or more, and the installation place may suitably be changed in accordance with the purpose.

First, a reinforcing fiber sheet 1a is provided with a resin 2a by a first coating head 20a to form a prepreg 1b provided with the resin 2a. Then, a prepreg 1d provided with a resin 2b is formed by a second coating head 20b. In addition, a resin 2c is applied from a third coating head 20c. In addition, the impregnation device 17 may be after the first coating head 20a, after the second coating head 20b, or after the third coating head 20c. As shown in FIG. 12, the first impregnation device 17a may be disposed after the second coating head 20b, and further, the second impregnation device 17b may be disposed after the third coating head 20c.

In the present invention, the method of coating a reinforcing fiber sheet conveyed substantially in the horizontal direction with a resin includes a step of discharging a resin in planar form and, in addition, applying the resin in such a manner that an angle made between the discharge direction of the resin and the conveyance direction of the reinforcing fiber sheet is 80° or less. As long as this step is included, a resin coating step not based on that step may be used in combination to the extent that the object of the present invention is not impaired. Examples include an aspect in which a thermosetting resin is discharged from the first coating head, and a hardener is discharged from the second coating head. In addition, examples include a case where coating from the second coating head is carried out with the reinforcing fiber sheet not substantially horizontal, a case where the reinforcing fiber sheet is substantially horizontal but where an angle made between the discharge direction of the resin and the conveyance direction of the reinforcing fiber sheet is more than 80°, and in addition, a case where a step of coating with a die brought in contact is combined after the coating step based on the first coating head, wherein the coating step is carried out according to an aspect of the present invention.

Next, some of the specific aspects will be described with reference to FIG. 12. For example, 56 yarns of carbon fiber (T800S-24K manufactured by Toray Industries, Inc.) can be used as reinforcing fibers 1, these are arranged unidirectionally using an arrangement device 12 to form a reinforcing fiber sheet 1a having a width of 300 mm, and a release paper sheet 3a is inserted onto the lower face of the reinforcing fiber sheet 1a at a conveyance roll 13a. Then, the reinforcing fiber sheet 1a is coated with a resin 2a from a first coating head 20a. As the resin 2a in this case, a resin A composed of a thermosetting epoxy resin (a mixture of an aromatic amine epoxy resin and a bisphenol epoxy resin) containing a hardener (diaminodiphenyl sulfone) and polyethersulfone can be used. The viscosity of this resin A can be 15 Pa·s at 90° C. at 3.14 sec$^{-1}$.

As the coating head 20a, a die coater having a slit nozzle 0.4 mm thick and 300 mm in the width direction can be used. The resin can be melted using a melter, then metered using a gear-pump, and supplied into the coating section. In this regard, the line from the melter to the supply section to the die coater is heated so that the line is under the same temperature. Air to planar portion can be supplied from a 0.1 mm thick slit immediately next to the coating section. In addition, air to edge portion can be supplied through a copper tube 2 mm in diameter. The coating height H can be set to 10 mm, and the coating angle can be set to 65°. The pressure of air to edge portion can be set to 0.1 MPa, and the pressure of air to planar portion can be set to 0.2 MPa. The resin 2 is captured on a table 18a, and the reinforcing fiber sheet 1a can be conveyed linearly even with air to edge portion and air to planar portion being applied.

<Aspect A>

An aspect A as a first aspect will be described below. First, a resin A is discharged in planar form from a first coating head 20a so that a prepreg 1b can be formed. Here, the coating angle of the first coating head 20a can be set to 65°, the temperature can be set to 90° C., and the discharge amount of the resin A can be set to 360 g/minute. Without using a second coating head 20b, a release paper sheet 3b is then inserted, at conveyance rolls 13b, onto the upper face of a prepreg 1b provided with a resin, and the resulting sheet is allowed to undergo impregnation in a first impregnation device 17a, and can be cooled by a first cooling device 19a. Then, a release paper sheet 3b is peeled off at conveyance rolls 13c, and a prepreg 1d can be coated with a resin 2c using a third coating head 20c. As the resin 2c in this case, a resin B composed of a thermosetting epoxy resin (a mixture of an aromatic amine epoxy resin and a bisphenol epoxy resin) containing a hardener (diaminodiphenyl sulfone), polyethersulfone, and microparticles made of a thermoplastic resin can be used. Here, as the microparticle made of a thermoplastic resin, the "particle 3" described in EXAMPLES in JP 2011-162619 A can be used. The viscosity of the resin B can be 15 Pa·s at 105° C. at 3.14 sec$^{-1}$. The coating angle of the third coating head 20b can be set to 65°, the temperature can be set to 105° C., and the discharge amount of the resin B can be set to 240 g/minute. Then, a release paper sheet 3c is inserted, at conveyance rolls 13d, onto the upper face of a prepreg 1e, and the resulting sheet is allowed to undergo impregnation in a second impregnation device 17b, and cooled by a second cooling device 19b, and can be wound up by a wind-up device 16. In this regard, the conveyance speed of the prepreg can be set to 20 m/minute. In this manner, a prepreg containing organic microparticles can be produced.

<Aspect B>

In an aspect B that is an aspect other than the aspect A, a resin C composed of a mixture of an aromatic amine epoxy resin and polyethersulfone is used as a resin 2a applied using a first coating head 20a, the discharge amount can be set to 280 g/minute, the temperature of the coating head 20a can be set to 120° C., and the coating angle can be set to 65°. The viscosity of the resin C can be 7 Pa·s at 120° C. at 3.14 sec$^{-1}$. In this case, the resin C has a low viscosity, and accordingly, the coating height can be lowered to 5 mm. In addition, a resin D composed of a bisphenol epoxy resin containing a hardener (diaminodiphenyl sulfone) is used as a resin 2b applied using a second coating head 20b, the discharge amount can be set to 320 g/minute, the temperature of the coating head 20b can be set to 30° C., and the coating angle can be set to 65°. The viscosity of the resin D can be 15 Pa·s at 30° C. at 3.14 sec$^{-1}$. Polyethersulfone has a long molecular chain, which causes intertangling, leading to a high viscosity, and accordingly, requires a high temperature for coating, but a hardener is preferably handled at as low a temperature as possible in order to suppress the progress of a curing reaction. For this reason, separating a high-viscosity-causing material such as polyethersulfone and a hardener as in the present aspect B enables the coating heads to be set to the respective desirable temperatures. The carbon fiber sheets are coated with the respective resins to form a prepreg 1d provided with a resin, a release paper sheet 3b is inserted onto the upper face of the prepreg, which can then be allowed to undergo impregnation by a first impregnation device 17a and cooling by a first cooling device 19a. Then, the release paper sheet 3b is peeled off, and the resulting sheet can be wound up by a wind-up device 16. Generally, a prepreg whose surface contains a large amount of resin having a high storage elastic modulus has lower tackiness properties. As to a matrix resin for CFRP, a thermoplastic resin such as polyethersulfone has a higher storage elastic modulus than an epoxy resin, and accordingly, a larger amount of the former resin contained in the surface of a prepreg lowers the tackiness properties. A prepreg obtained in the aspect B makes it possible to have a smaller amount of polyethersulfone present in the surface of the prepreg and accordingly, can have higher tackiness properties.

In addition, in the aspect B, a bisphenol epoxy resin containing microparticles made of a thermoplastic resin (the "particle 3") can be used as the resin 2c in the third coating head, whereby the surface of the prepreg can be further provided with microparticles made of a thermoplastic resin (an aspect C). In addition, urethane particles or polyamide particles can be used (an aspect D) in place of the "particle 3". In place of the microparticles made of a thermoplastic resin, a mixture of a bisphenol epoxy resin and carbon particles can be provided (an aspect E). Alternatively, in place of the carbon particles, inorganic particles such as metal particles and metal oxide/nitride particles can be used (an aspect F). In addition, in place of the microparticles, a mixture of a flame retardant, such as red phosphorus, and an epoxy resin can be used (an aspect G).

Furthermore, it is possible that, after a prepreg is formed by the production method according to the present invention, a solid material such as particles is scattered on the prepreg before the wind-up step. The solid can be selected from hardeners, organic microparticles for enhancing toughness and damping performance, inorganic microparticles for enhancing conductivity, flame retardants, and the like in accordance with the purpose.

In addition, it is suitable that, after a prepreg is formed by the production method according to the present invention, the prepreg is subsequently slit into prepreg tapes, which are then wound up. In this case, it is preferable to impregnate the prepreg sufficiently with the resin and to cool the prepreg sufficiently, taking into consideration the processability in the slitting step and the suppression of adhesion of dirt to the cutter.

The above description is concerned with the production of a 300 mm wide prepreg from 56 yarns of carbon fiber, but needless to say, use of a device adapted for a width of 1000 mm or 1600 mm or an even larger width is preferable, with a view to obtaining higher production efficiency. Obviously, the number of yarns of carbon fiber to be used and its fineness can be suitably selected accordingly.

A prepreg obtained by the production method according to the present invention can be formed into CFRP using usual CFRP-making technology and facilities, and makes it possible that, after a prepreg is obtained by the above-mentioned method of producing a prepreg, the prepreg is cured to produce a fiber reinforced composite material. Accordingly, the prepreg has high versatility and compatibility with facilities. For this reason, the prepreg can be suitably used for articles composed of and/or partially containing various CFRPs.

EXAMPLES (Reinforcing Fiber Sheet)

A 280 mm wide UD sheet was formed using 56 yarns of carbon fiber, "TORAYCA (registered trademark)" T800S-24K (manufactured by Toray Industries, Inc.), and an arrangement device 12 in FIG. 1.

(Matrix Resin)

In each of Examples and Comparative Examples, a resin E prepared using the following formulation was used as a matrix resin for a prepreg. The resin E is composed of an epoxy resin (a mixture of an aromatic amine epoxy resin and a bisphenol epoxy resin) containing a hardener (diaminodiphenyl sulfone) and polyethersulfone.

(Viscosity Measurement)

The viscosity of the matrix resin was measured using a dynamic viscoelasticity measurement device (ARES, manufactured by TA Instruments, Inc.). Parallel plates having diameter of 40 mm were used for the device, and a matrix resin was set in a 1 mm gap between the plates. Then, a measurement was taken at a measurement frequency of 0.5 Hz (3.14 sec$^{-1}$) at a temperature ramp rate of 1.5° C./minute to obtain a temperature-viscosity curve. The viscosity of the resin E was 35 Pa·s at 70° C. The viscosities of the matrix resins shown in the present Examples and Comparative Examples are the viscosities read from the temperature-viscosity curve obtained here and read at a temperature set at the coating section.

(Resin Coating Device)

As the coating device, a die coater having a slit nozzle 0.4 mm thick and 300 mm in the width direction was used. The resin was melted using a melter, then metered using a gear-pump, and supplied into the coating section. In this regard, the line from the melter to the supply section to the die coater was heated so that the line was under the same temperature. Air to planar portion 21 was supplied from a 0.1 mm thick slit immediately next to the coating section. Air to edge portion 22 was supplied through a copper tube 2 mm in diameter (see FIG. 9).

(Observation of Disturbance of Arrangement of Reinforcing Fibers on Surface of Prepreg)

The obtained prepreg was withdrawn at least 1 m or more in the longitudinal direction and at least 1 m² or more as the total area of the prepreg, approximately the smallest amount of sample that satisfied both the conditions was taken, and the surface was checked by visual observation. A sample having no disturbance in the fiber arrangement was rated as ○, and a sample having some disturbance observed in the arrangement was rated as x. For example, a 280 mm wide prepreg was withdrawn 4 m or more in the longitudinal direction, a sample was taken, and the surface was checked by visual observation.

(Evaluation of Production Speed)

The highest production speed (running speed) at which production was possible without breakage of the resin film was evaluated, and A or a better result was regarded as acceptable.

●: 20 m/minute or more
○: 10 m/minute or more and less than 20 m/minute
Δ: 5 m/minute or more and less than 10 m/minute
x: less than 5 m/minute (Evaluation of Stability)

The production stability of a prepreg was evaluated on the basis of a continuous running time possible at a conveyance speed (running speed) of 10 m/minute, and A or a better result was regarded as acceptable.

○: 60 minutes or more
Δ: 10 minutes or more and less than 60 minutes
x: less than 10 minutes (Evaluation of Neck-in)

The amount of neck-in caused when the reinforcing fiber sheets were each coated with a resin (the length of the G portion, see FIG. 5 and FIG. 6).

○: less than 10 mm
Δ: 10 mm or more and less than 20 mm
x: 20 mm or more

Below, Examples and Comparative Examples will be described in detail.

Examples 1 to 3

The process used in the present Examples is shown in FIG. 1 (the impregnation device 17 was not used), and the coating device used in the Examples is shown in FIG. 9. In the operation, the discharge amount of resin E was 97 g/minute, the coating section temperature was 70° C., the pressure of air to edge portion was 0.1 MPa, and the pressure of air to planar portion was 0.2 MPa. On this basis, the carbon fiber sheet was coated with the resin E at a running speed of 20 m/minute under the conditions described in Table 1, neither fuzz clogging nor yarn breaking occurred, no sign of fuzz clogging was observed, and the prepreg production speed was excellent. Furthermore, a coating of the resin E was on the carbon fiber sheet, and no coating defect was observed. However, in Example 1 in which the coating angle θ was larger, the stability was slightly lower, though not problematic.

Example 4

Coating was carried out in the same manner as in Example 1 except that the coating angle and the coating height were changed as in Table 1. In Example 4, there was some fear that the small coating angle of 25° could cause the coating section to interfere with the process, and accordingly the coating height was set to 20 mm. Because of this, the formation of a resin film in the air was slightly unstable, and the stability was slightly lower, though not problematic.

Comparative Example 1

Coating was carried out in the same manner as in Example 1 except that the coating angle was 90°. At a running speed of 20 m/minute, the resin film was broken, and accordingly, stable coating was not possible. Because of this, a coating experiment was carried out at an increased coating section temperature of 105° C. to decrease the viscosity of the resin E and further at a lowered running speed, but neither the production speed nor the stability was good, and stable coating was not possible.

Example 5

Coating was carried out in the same manner as in Example 2 except that the running speed was changed to 10 m/minute. The neck-in was suppressed.

Example 6

Coating was carried out in the same manner as in Example 5 except that the air to edge portion was not used. The neck-in exhibited a tendency to increase.

TABLE 1

| | | Example 1 | Example 2 | Example 3 | Example 4 | Comparative Example 1 |
|---|---|---|---|---|---|---|
| Performing Conditions | Coating Angle θ (°) | 75 | 65 | 40 | 25 | 90 |
| | Coating Height H (mm) | | 10 | | 20 | 10 |
| | Air to Edge Portion | | Yes | | | Yes |
| Evaluation | Disturbance of Fiber Arrangement | ○ | ○ | ○ | ○ | x |
| | Production Speed | ○ | ● | ● | ● | x |
| | Stability | Δ | ○ | ○ | Δ | x |
| | Neck-in | ○ | ○ | ○ | Δ | ○ |

TABLE 2

| | | Example 5 | Example 6 |
|---|---|---|---|
| Performing Conditions | Coating Angle θ (°) | 65 | |
| | Coating Height H (mm) | 10 | |
| | Running Speed (m/minute) | 10 | |
| | Air to Edge Portion | Yes | No |
| Evaluation | Neck-in | ○ | Δ |

Examples 7 to 12

A prepreg was prepared under the same conditions as in Example 1 to 6 except that the impregnation was carried out using the impregnation device 17 (Example 1 corresponds to Example 7, and Example 2 corresponds to Example 8. The other Examples correspond in the same manner.). Furthermore, this prepreg was allowed to undergo lamination and bagging so as to be quasi-isotropic, and then, cured in an autoclave at a temperature of 180° C. at a pressure of 6 atm for two hours to obtain a carbon fiber reinforced material. The material that is of good grade and has a good mechanical property was obtained.

Examples 13 to 16

A prepreg was prepared under the conditions described in Table 3 in the same manner as in Examples 1 to 4 except that 53 yarns of carbon fiber were used, the below-mentioned resin F was used as a matrix resin, the discharge amount of the resin F was 600 g/minute, and the temperature of the coating section was 85° C. The resin F is composed of an epoxy resin (a mixture of an aromatic amine epoxy resin and a bisphenol epoxy resin) containing a hardener (diaminodiphenyl sulfone) and polyethersulfone, and had a viscosity of 21 Pa·s at 85° C. at 3.14 sec$^{-1}$.

In any of the Examples, the resin film caused no breakage in the coating process at a running speed of 10 m/minute or more, and further, exhibited neither disturbance of the fiber arrangement nor generation of fuzz due to coating, and a prepreg of excellent grade was obtained. In addition, the running speed was 20 m/minute or more, which means a high production speed, in Examples 14 to 16. Furthermore, the production stability was excellent in Examples 14 and 15. In addition, the neck-in was suppressed sufficiently in Examples 13 to 15.

Comparative Example 2

Coating was carried out in the same manner as in Example 14 except that the coating angle was 90°. At a running speed of 20 m/minute, the resin film was broken, and accordingly, stable coating was not possible. Because of this, a coating experiment was carried out at an increased coating section temperature of 105° C. to decrease the viscosity of the resin E and further at a lowered running speed, but neither the production speed nor the stability was good, and stable coating was not possible.

TABLE 3

| | | Example 13 | Example 14 | Example 15 | Example 16 | Comparative Example 2 |
|---|---|---|---|---|---|---|
| Performing Conditions | Coating Angle θ (°) | 75 | 65 | 40 | 25 | 90 |
| | Coating Height H (mm) | | 10 | | 20 | 10 |
| | Air to Edge Portion | | Yes | | | Yes |
| Evaluation | Disturbance of Fiber Arrangement | ○ | ○ | ○ | ○ | x |
| | Production Speed | ○ | ● | ● | ● | x |
| | Stability | Δ | ○ | ○ | Δ | x |
| | Neck-in | ○ | ○ | ○ | Δ | ○ |

Example 17

Coating was carried out in the same manner as in Example 14 except that the pressure of the air to edge portion was 0.02 MPa. The neck-in exhibited a tendency to increase, though not problematic.

Example 18

Coating was carried out in the same manner as in Example 14 except that the running speed was 10 m/minute, and the pressure of the air to planar portion was 0.02 MPa. The running stability did not surpass that in Example 14, though not problematic.

Examples 19 to 24

A prepreg was prepared under the same conditions as in Example 13 to 18 except that the discharge amount of the resin F and the production speed were 300 g/minute and 10 m/minute respectively in Examples 19 and 24, that the discharge amount of the resin F and the production speed were 600 g/minute and 20 m/minute respectively in Examples 20 to 23, and in addition, that the impregnation was carried out using the impregnation device 17 in all these Examples (Example 13 corresponds to Example 19, and Example 14 corresponds to Example 20. The other Examples correspond in the same manner.). Furthermore, this prepreg was allowed to undergo lamination and bagging so as to be quasi-isotropic, and then, cured in an autoclave at a temperature of 180° C. at a pressure of 6 atm for two hours to obtain a carbon fiber reinforced material. The material that is of good grade and has a good mechanical property was obtained.

The present application is based on Japanese Patent Application No. 2017-055613 filed on 22 Mar. 2017, the content of which is incorporated herein by reference.

REFERENCE SIGNS LIST

1 Reinforcing Fiber
1a Reinforcing Fiber Sheet
1b, 1c, 1d, 1e Reinforcing Fiber Sheet Provided with Resin (Prepreg)
2, 2a, 2b, 2c, 2d Resin
3, 3a, 3b, 3c Release Sheet
11 Creel
12 Arrangement Device
13a, 13b, 13c, 13d, 13e Conveyance Roll
14a, 14b, 14c Release Sheet Supply Device
15, 15a, 15b Release Sheet Wind-up Device
16 Wind-up Device
17 Impregnation Device
18a, 18b, 18c Table
19, 19a, 19b Cooling Device
20 Coating Section
20a First Coating Head
20b Second Coating Head
20c Third Coating Head
21 Air to Planar Portion
22 Air to Edge Portion
E Blowing Direction of Air to Edge Portion
F Blowing Direction of Air to Planar Portion
G Neck-in
H Coating Height
X Running Direction (Horizontal Direction) of Reinforcing Fiber Sheet 1a
B Direction Perpendicular to Running Direction (Horizontal Direction) of Reinforcing Fiber Sheet 1a
θ Coating Angle

The invention claimed is:

1. A method of producing a prepreg, comprising:
    discharging a molten resin in planar form from a slit to form a resin film, and forming a film-shaped object in a space into which the molten resin is discharged,
    applying said resin film onto a reinforced fiber sheet conveyed continuously,
    wherein said reinforced fiber sheet is conveyed substantially in the horizontal direction,
    wherein an angle made between the discharge direction of the molten resin and the conveyance direction of said reinforced fiber sheet is 80° or less; and
    wherein an air flow is applied to the edge portion of said film-shaped object formed in the space in the width direction from a front of the film-shaped object so that the edge portion of the resin film can be expanded when said reinforced fiber sheet is coated with said resin film, and
    wherein a distance between a center of a discharge line and said reinforcing fiber sheet is 3 mm or more and 18 mm or less; and
    wherein a viscosity of the molten resin is 21 Pa·s or less.

2. The method of producing a prepreg according to claim 1, wherein, using two or more coating heads, both faces of said reinforced fiber sheet are coated with a substance selected from the group consisting of the molten resin; a mixture of the molten resin and an additive; and an additive.

3. The method of producing a prepreg according to claim 1, wherein, using two or more coating heads, said reinforced fiber sheet is coated with two or more kinds of resins.

4. The method of producing a prepreg according to claim 1, wherein said reinforced fiber sheet is coated with and then impregnated with said resin film.

5. The method of producing a prepreg according claim 1, wherein another air flow is applied from the front of said film shaped object to the whole face of the film-shaped object in such a manner that the position where the film-shaped object comes in contact with the reinforcing fiber sheet is brought nearer to a coating section side.

6. The method of producing a prepreg according claim 1, wherein the conveyance speed of the reinforcing fiber sheet and the prepreg is 10 m/minute to 100 m/minute.

7. A method of producing a fiber-reinforced composite material, comprising:
    obtaining a prepreg by the method of producing a prepreg according to claim 1; and then
    curing said prepreg.

* * * * *